United States Patent
Weaver et al.

(10) Patent No.: US 7,061,540 B2
(45) Date of Patent: Jun. 13, 2006

(54) PROGRAMMABLE DISPLAY TIMING GENERATOR

(75) Inventors: Mark Weaver, Phoenix, AZ (US); Bart Decanne, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 496 days.

(21) Appl. No.: 10/025,039

(22) Filed: Dec. 19, 2001

(65) Prior Publication Data

US 2003/0112372 A1 Jun. 19, 2003

(51) Int. Cl.
*H04N 5/04* (2006.01)
(52) U.S. Cl. ............ 348/500; 348/177; 348/516; 348/542; 348/543; 348/544; 348/555; 345/698; 345/699
(58) Field of Classification Search .......... 348/500, 348/177, 510–511, 516–517, 522, 536, 542–544, 348/555, 504; 345/213, 698–699; H04N 5/04, H04N 9/44
See application file for complete search history.

(56) References Cited

U.S. PATENT DOCUMENTS

| | | | | |
|---|---|---|---|---|
| 4,670,782 A * | 6/1987 | Harshbarger et al. | ....... | 348/183 |
| 4,872,054 A * | 10/1989 | Gray et al. | ......... | 348/441 |
| 5,027,212 A * | 6/1991 | Marlton et al. | ......... | 348/512 |
| 5,262,861 A | 11/1993 | Herz | | |
| 5,268,756 A | 12/1993 | Vavreck et al. | | |
| 5,371,851 A * | 12/1994 | Pieper et al. | ......... | 345/501 |
| 5,463,565 A * | 10/1995 | Cookson et al. | ......... | 711/113 |
| 5,486,868 A * | 1/1996 | Shyu et al. | ......... | 348/524 |
| 5,537,157 A | 7/1996 | Washino et al. | | |
| 5,606,348 A | 2/1997 | Chiu | | |
| 5,764,302 A * | 6/1998 | Park | ......... | 348/542 |
| 5,790,096 A | 8/1998 | Hill, Jr. | | |
| 5,859,626 A | 1/1999 | Kawamura | | |
| 5,907,369 A | 5/1999 | Rumreich et al. | | |
| 5,936,677 A * | 8/1999 | Fries et al. | ......... | 348/512 |
| 5,963,200 A | 10/1999 | Deering et al. | | |
| 5,963,266 A * | 10/1999 | Fujimori | ......... | 348/511 |
| 6,008,858 A | 12/1999 | Swan et al. | | |
| 6,037,994 A * | 3/2000 | Bae | ......... | 348/510 |
| 6,049,316 A * | 4/2000 | Nolan et al. | ......... | 345/698 |
| 6,100,886 A * | 8/2000 | Lin | ......... | 345/709 |
| 6,177,922 B1 | 1/2001 | Schiefer et al. | | |
| 6,211,918 B1 * | 4/2001 | Uwabata et al. | ......... | 348/458 |
| 6,278,433 B1 * | 8/2001 | Narui | ......... | 345/581 |
| 6,316,974 B1 | 11/2001 | Taraci et al. | | |
| 6,348,931 B1 * | 2/2002 | Suga et al. | ......... | 345/699 |
| 6,362,853 B1 * | 3/2002 | Ouchiyama et al. | ......... | 348/556 |
| 6,392,708 B1 * | 5/2002 | Cho | ......... | 348/556 |
| 6,636,269 B1 * | 10/2003 | Baldwin | ......... | 348/500 |
| 6,831,634 B1 * | 12/2004 | Shigeta | ......... | 345/213 |
| 2004/0189870 A1 * | 9/2004 | Champion et al. | ......... | 348/510 |

* cited by examiner

*Primary Examiner*—Brian P. Yenke
(74) *Attorney, Agent, or Firm*—W. James Brady, III; Frederick J. Telecky, Jr.

(57) ABSTRACT

A display timing generator is provided for selecting line types and providing synchronization timing signals for video signals. The display timing generator provides programmability for the user to select line types for a frame to be displayed on a display. The line types defining rise and fall times, synchronization shapes, blanking levels and horizontal and vertical timings for providing a desired display format to different display types. A plurality of programmable parameters for pulse width, horizontal timing and voltage amplitude allow a user to define timing variations associated with a given line type. The display timing generator also includes a generic mode for allowing a programmer to select line types for particular groupings of lines.

19 Claims, 11 Drawing Sheets

PROGRAMMABLE DISPLAY TIMING GENERATOR

TECHNICAL FIELD

The present invention relates to electrical circuits and more particularly to a programmable display timing generator for digital video signals.

BACKGROUND OF INVENTION

Video signals can be represented as either composite video or component video. Using frequency interleaving, composite video contains luminance (e.g., Y) and chrominance (e.g., U, V) information in a single signal. In component video, the color "component" signals (e.g., red, green and blue) are carried on separate wires. Video synchronization can be signaled by either dedicated horizontal synchronization (Hsync) and vertical synchronization (Vsync) signals, as is normally the case for PC graphics, or both types of synchronization signals can be combined into a single "composite synchronization" signal. Composite video carries an embedded composite synchronization signal. Component video may embed a composite synchronization on at least one of its signal components, or, alternatively, may carry a composite synchronization or Hsync and Vsync signals on additional separate wires. The characteristics of a video format include the number of rows and columns per field, the number of fields per frame (e.g., 1 for progressive-scan, 2 for interlaced-scan video) and the number of frames per second.

Presently, three systems for composite video exist worldwide. The systems are the National Television Standard Committee (NTSC) format, the Phase Alternating Line (PAL) and the Sequentiel Couleur A Memoire (SECAM) format. Within each system, several variations or sub-standards exist. Component video can be represented equivalently in one of several color spaces (e.g., RGB, YCbCr). Component video in any of these color spaces can possibly include a "composite synchronization" signal inserted on a single component (e.g., inserted on the green or luma (Y) channel, referred to as sync-on-green or sync-on-Y). For standard definition TV, component video can have the same video timing characteristics as its corresponding NTSC, PAL or SECAM composite formats. Composite video is only defined for standard-definition video signals. For PC graphics and high-definition TV, only a component video representation exists. Furthermore, PC graphics formats are normally always carried in the RGB color space and can have different timing characteristics depending on resolution and screen refresh rate (e.g., VGA, SVGA, XGA SXGA @ 60, 75 or 85 Hz refresh rates). On the other hand, digital television video (DTV) formats typically utilize component video signals in the YCbCr domain not the RGB domain.

Traditionally, only a limited number of video display formats have been in use for standard-definition television (SDTV). Recently, the introduction of high-definition television (HDTV) and the convergence of personal computers and television applications have increased the number of display formats that may need to be supported by consumer video end equipment such as set-top boxes (STB), Digital Video Disc Players (DVD), Digital-TV (DTV) receivers, Personal Computer television (PCTV) end equipment or high-end (projection) TV sets. When only a limited number of video display formats need to be supported, the "display timing generator" sub-block, which generates the required output video synchronization that accompanies the analog component video signal, can be hard-coded within the video "source" equipment (e.g., DVD player, STB, computer graphics cards). This video synchronization accompanies the video signal and allows the video "sink" equipment (e.g., TV set, projector, PC monitor) to properly display the video content.

As previously discussed, the video synchronization signals in TV systems are typically not carried separately from the video signal itself, as is commonly the case in the PC graphics environment. Instead such synchronization is embedded within the analog component video signal as a "composite synchronization" signal. Furthermore for broadcasting, the bandwidth of the overall video signal, that includes the embedded composite synchronization signal, needs to be limited. Therefore, the shape of the composite sync should be controlled, in particular its rise and fall time. Such "synchronization shaping" presents an additional requirement not found in PC graphics systems, which utilize binary (non-bandwidth limited) Hsync/Vsync signals carried on dedicated wires.

SUMMARY OF INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides for a display timing generator for selecting line types (e.g., HDTV mode, SDTV mode) and providing synchronization timing signals for component video signals. The display timing generator provides programmability for the user to select line types for a frame to be displayed on a display or monitor. The line types define rise and fall times, synchronization shapes, blanking levels and horizontal and vertical timings for providing a desired display format for different display types. A plurality of programmable parameters define pulse width, horizontal timing and voltage amplitudes, which allow a user to define timing variations associated with a given line type. A particular video format consists of a pre-stored sequence of line types, each with its own programmable set of timings and amplitudes. Additionally, the display timing generator includes a generic mode for allowing a programmer to select line types for particular groupings of lines. The display timing generator allows the user to define the line type of each line in the video frame and, by doing so, build up the entire frame. Therefore, a programmer can create a variety of standard and custom video formats for a TV display (e.g., HDTV, SDTV) or PC monitor. The display timing generator is also programmable to receive and provide either embedded or dedicated synchronization signals.

The following description and the annexed drawings set forth certain illustrative aspects of the invention. These aspects are indicative, however, of but a few of the various ways in which the principles of the invention may be employed. Other advantages and novel features of the invention will become apparent from the following detailed description of the invention when considered in conjunction with the drawings.

DETAILED DESCRIPTION OF THE INVENTION

Figure 1:
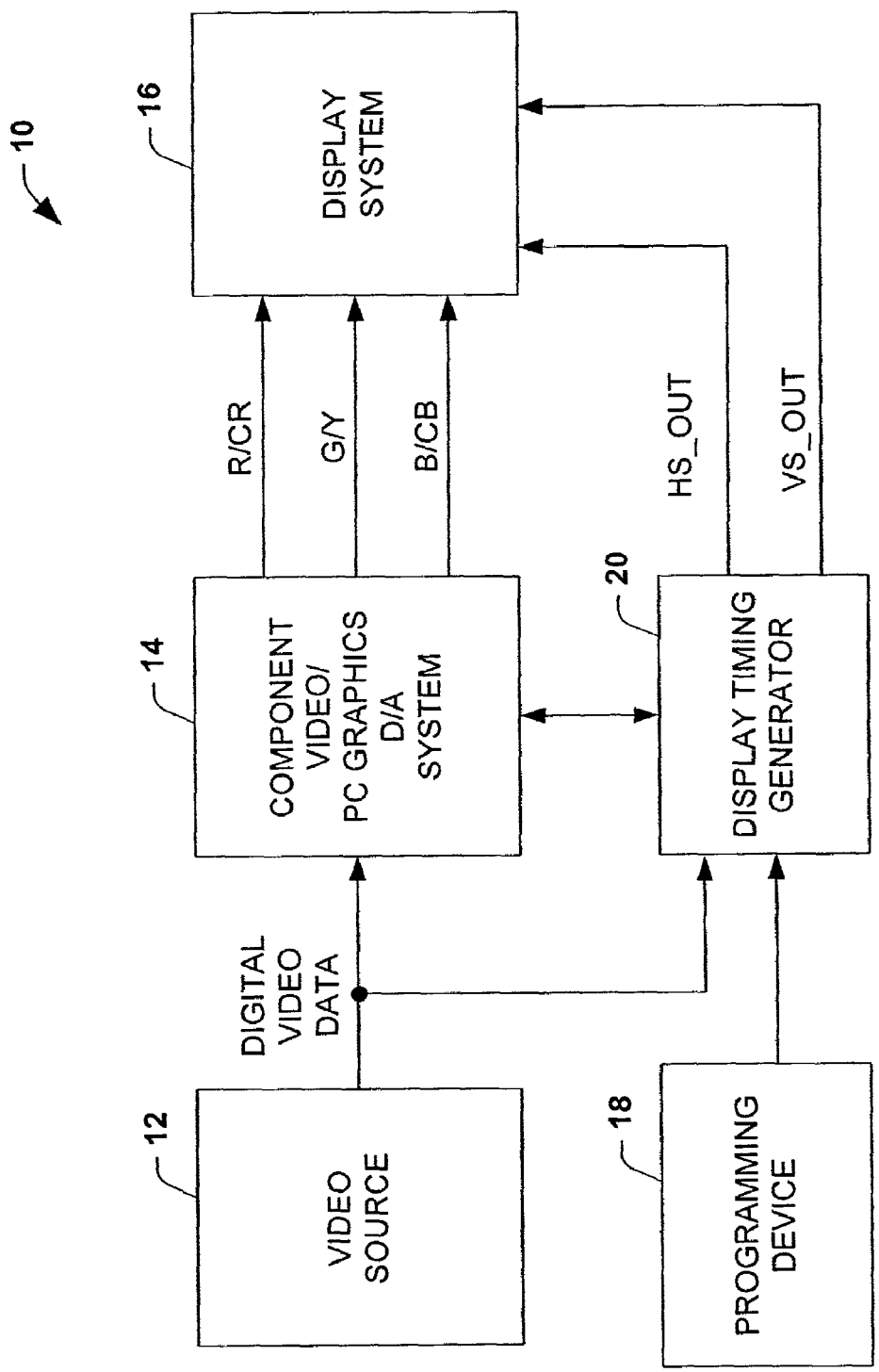
FIG. 1 illustrates a functional block diagram of a video system in accordance with an aspect of the present invention.

The present invention relates to a display timing generator for selecting line types and providing synchronization timing signals for component video signals. The display timing generator provides programmability for the user to select line types (e.g., sync only line types, active video or various other line types) for any of the lines that make up a particular video format, as well as to program the width and amplitude of each excursion that occurs on a given line type. The user can program the display timing generator to change what line type is displayed on every line of the frame. The display timing generator can be programmed to provide horizontal timing signals (e.g., regular horizontal timing signals, serration pulse signals, equalization pulse signals) and vertical timing signals. The display timing generator includes pre-stored line type sequences of currently popular video formats. The display timing generator also includes a generic mode for allowing a programmer to select line types for particular groupings of lines. Therefore, a programmer can create a variety of different formats for different TV or monitor types. The display timing generator of the present invention allows the user to define non-standard or custom video formats.

Each line type has different "excursions" from the zero video, or "blanking", level. Such excursions may include horizontal sync, vertical sync, serration or equalization pulses. A line type defines the sequence of excursions that is allowed for this line type. For example, some lines allow for only a horizontal sync signal and active video, while others consist of a more complex sequence of horizontal sync and vertical sync interspersed by several serration pulses. For any given line type, the user can program the width of the allowed excursions and its amplitude level. For example, the amplitude of the negative and positive sync excursions can be programmed for high-definition TV formats.

The programmed display timing generator can be programmed to change the frame format (e.g., number of pixels per line, number of lines per frame, 1 or 2 fields per frame) and can be programmed to change the timing by changing the width and positions of each of the different excursions allowed by each line type by programming the horizontal timings. Furthermore, the user can program which line type is selected on each video line. Therefore, the display timing generator can define the relationship between the digital video data coming in and the component video data going out prior to digital-to-analog conversion of the component video data. By allowing such flexible control over the construction of video frame formats, a wide range of video formats and display types can be supported.

The present invention provides an efficient minimum set of video frame definition parameters for both graphics and TV, and is highly flexible to be useable for both video and graphics signals. The display timing generator can function either slaved to incoming video source data (e.g., with dedicated syncs, from which the current invention can derive a programmable composite sync) or can impose its timing onto the source delivering the video data (e.g., as could be the case when the video data is read from a video frame memory).

FIG. 1 illustrates a video system 10 having a display timing generator 20 coupled to a component video/PC graphics D/A system 14. The display timing generator 20 can be programmed utilizing a programming device 18. The programming device 18 (e.g., PC) can, for example, be coupled to the display timing generator 20 through an industry standard I²C Interface to an I²C bus. The I²C bus is a two-wire serial bus. One wire is the Serial Clock Line (SCL), and the other is the Serial Data Line (SDA). The bus is controlled by a bus master device that tells slave devices when they can access the bus. The display timing generator 20 can be programmed off-line and provided in the system 10. Alternatively, the display timing generator 20 can be programmed in real-time when placed in a programming mode.

A video source component 12 (e.g., satellite receiver, DVD player, STB, computer graphics card) provides digital video data to the component video/PC graphics D/A system 14. The digital video data is in the form of a digital stream and can include digital video data with an encoded synchronization signal or a synchronization signal separate from the digital video data. The digital timing generator 20 receives this synchronization data, either directly or extracted from the video source data. The display timing generator 20 is programmed to define the relationship between the active video and synchronization signals received from the video source 12 and the active video and synchronization signals at the output prior digital-to-analog conversion of the component video data. For each video format, the relationship between the video synchronization and video data is defined, and thus the delays can be programmed in the display timing generator 20. The other video format parameters for each video format identified above can be defined and can be programmed into the device.

The display timing generator 20 also provides programmability of the horizontal/vertical offset of the synchronization contents with respect to active video, in order to allow the repositioning of the video data on the display device. The display timing generator 20 also provides programmability of the actual video format definition to allow for such changes due to revisions in one or more video standards. For example, one DTV interface standard was revised by the standards body (EIA/CEA) resulting in a different number of lines within the vertical blanking interval. The display timing generator 20 can be programmed to modify the timing associated with line types and programmed to provide additional line types, so that changed in specification standards can be accommodated for without the need for replacement of the display timing generator.

The display timing generator 20 also allows the user to redefine the complete video frame format (e.g., horizontal/vertical dimension of the video frame, as well as timing definition and waveform shapes of the synchronization signal contents) to provide for future extension of and/or support for non-standard video formats. The programmable display-timing generator 20 has the flexibility to create arbitrary synchronization signals for video display formats. It can accept horizontal/vertical synchronization input from an uncompressed video source, such as the output of an MPEG-2 decoder component in a DVD player or STB, and generate the frame format for the analog component video signal that results after D/A conversion.

The display timing generator 20 is also able to compensate for relative timing differences between the digital input video signal and these accompanying input video timing signals, while still preserving the correctness of the timing of the output video frame. Finally, the display timing generator 20 can either slave its synchronization to the source video format, or alternatively, it can also operate in a "master timing" mode. In the master timing mode, the display timing generator will impose a user-defined video display-timing format onto the source, which will provide synchronized video data to these timing signals.

The programmed display timing generator 20 provides the appropriate line types for each line, synchronization signals and amplitude parameters associated with the synchronization signals to the component video/PC graphics D/A system 14. The component video/PC graphics D/A system 14 includes a multiplexer that selects between the video data and the data excursions generated by the digital timing generator 20. Additional functionality may be included in the system 10 containing the digital timing generator, such as color space conversion, video filtering, data management, data insertion, and digital-to-analog conversion of the digital data to provide the analog component video signals, in either red, green and blue or another color space representation (e.g., YCbCr), to a display system 16. The display system 16 can be a variety of different types of display monitors (e.g., HDTV monitor, SDTV monitor, PC monitor).

The present invention also provides the ability to derive dedicated programmable synchronization signals, in parallel to the composite sync video waveform, as is common for PC applications. Thus, the display timing generator 20 can be programmed to provide horizontal (HS_OUT) and vertical (VS_OUT) synchronization signals separate from the video lines to the display system 16. The display timing generator 20 can be programmed to provide for separate synchronization signals from the component video prior to implementation to the system or in real-time.

Figure 2:
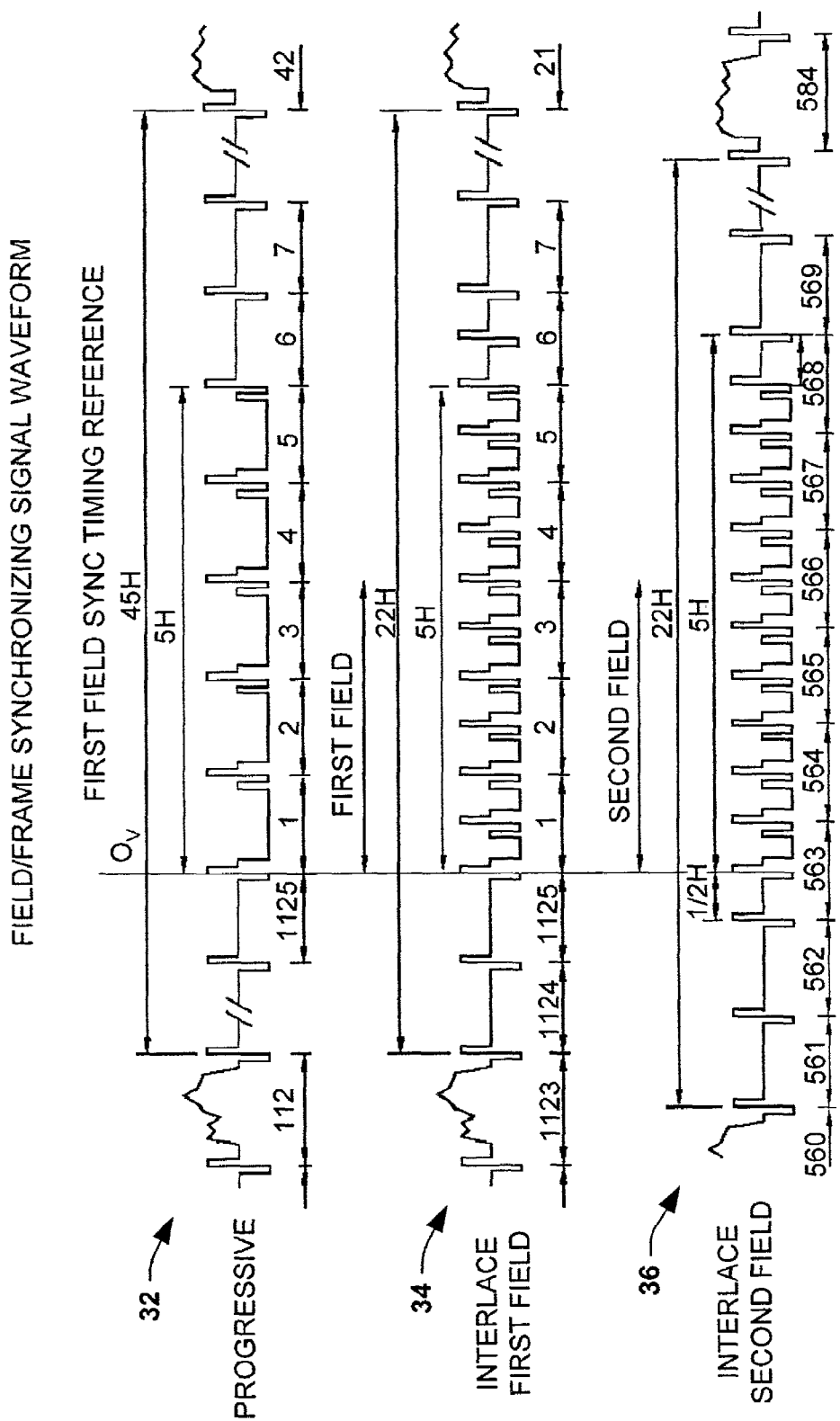
FIG. 2 illustrates a field frame synchronization waveform for 1080I interlaced and 1080P progressive video.

For the purpose of illustration, the display timing generator 20 will be illustrated with respect to providing programmable line types for HDTV formats and SDTV formats. FIG. 2 shows the resulting video signal for the case of the 1080I (1080 interlaced) and 1080P (1080 progressive) video formats. 1080I is one of the HDTV video formats in use today for terrestrial HDTV transmission in the United States. FIG. 2 illustrates a progressive waveform 32 of 1080P, an Interlaced first field waveform 34 of 1080I and an Interlaced second field waveform 36 of 1080I. Any video "source" device (e g., STB, DVD player, PC graphics card) needs to generate such a signal on its analog component video output, so that any compliant "HDTV-ready" TV set can accept and display this signal.

The format requires the use of synchronization signals that are both negative and positive going with respect to the video "blanking" level, such signals are termed "tri-level synchronization" signals and are required for HDTV video formats, while SDTV formats require the use of classical "bi-level" (negative) synchronization signals. The resulting video signal is complex and requires, next to the active video contents: "tri-level" horizontal synchronization pulses; "broad" synchronization pulses during either the first or $2^{nd}$ half (or both) of the video lines during the horizontal blanking interval; "interlaced" sync pulses at the center of the video line during some lines; and compliance to well-defined limited rise/and fall times on all sync edges to allow for bandwidth-limitation of the analog component video signal.

Referring to the progressive waveform 32, the lines are numbered from 1–1125 where the first five lines are lines of a first type (i.e., lines containing a vertical sync), lines 6–41 are lines of a second type (i e., blanking lines), lines 42–1121 are lines of a third type carrying active video and lines 1122–1125 are lines of the second type or a fourth type. The display timing generator of the present invention can be programmed to provide a desired line type to the output display regardless of the input stream from the video source. For example, lines 6 and 7 can be changed to the first or third line type or lines 3–5 can be changed to the second or third line type. In other words, the programmer determines which line type will be provided at any given line of a video frame prior to the data being received from the video source. A similar programming arrangement can be provided for the interlaced first field waveform 34 or the Interlaced second field waveform 36.

The Advanced Television Systems Committee (ATSC) is an international, non-profit membership organization developing voluntary standards for the entire spectrum of advanced television systems. ATSC is working to coordinate television standards among different communications media focusing on digital television, interactive systems, and broadband multimedia communications. ATSC is also developing digital television implementation strategies and presenting educational seminars on the ATSC standards. ATSC Digital TV Standards include digital high definition television (HDTV), standard definition television (SDTV), data broadcasting, multichannel surround-sound audio, and satellite direct-to-home broadcasting. Presently, there are 18 ATSC video formats, which impose (different) rise/fall times, sync shapes (different in both waveform shape as well as horizontal/vertical timing parameters) and horizontal/vertical timings. One of these 18 formats is the 1080I format discussed in FIG. 2.

Figure 3:
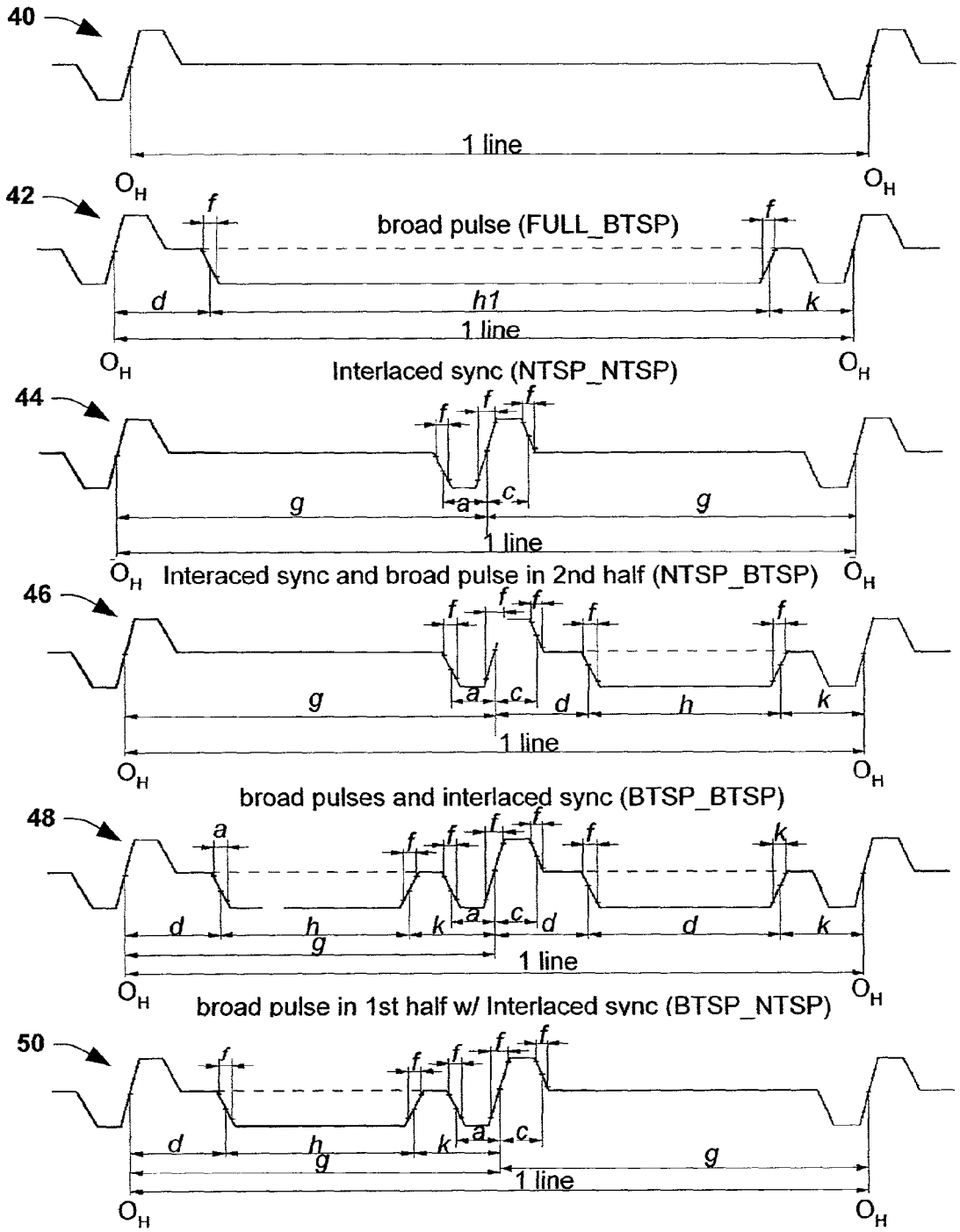
FIG. 3 illustrates a plurality of HDTV mode line types and associated programmable parameters in accordance with an aspect of the present invention.
Figure 4:
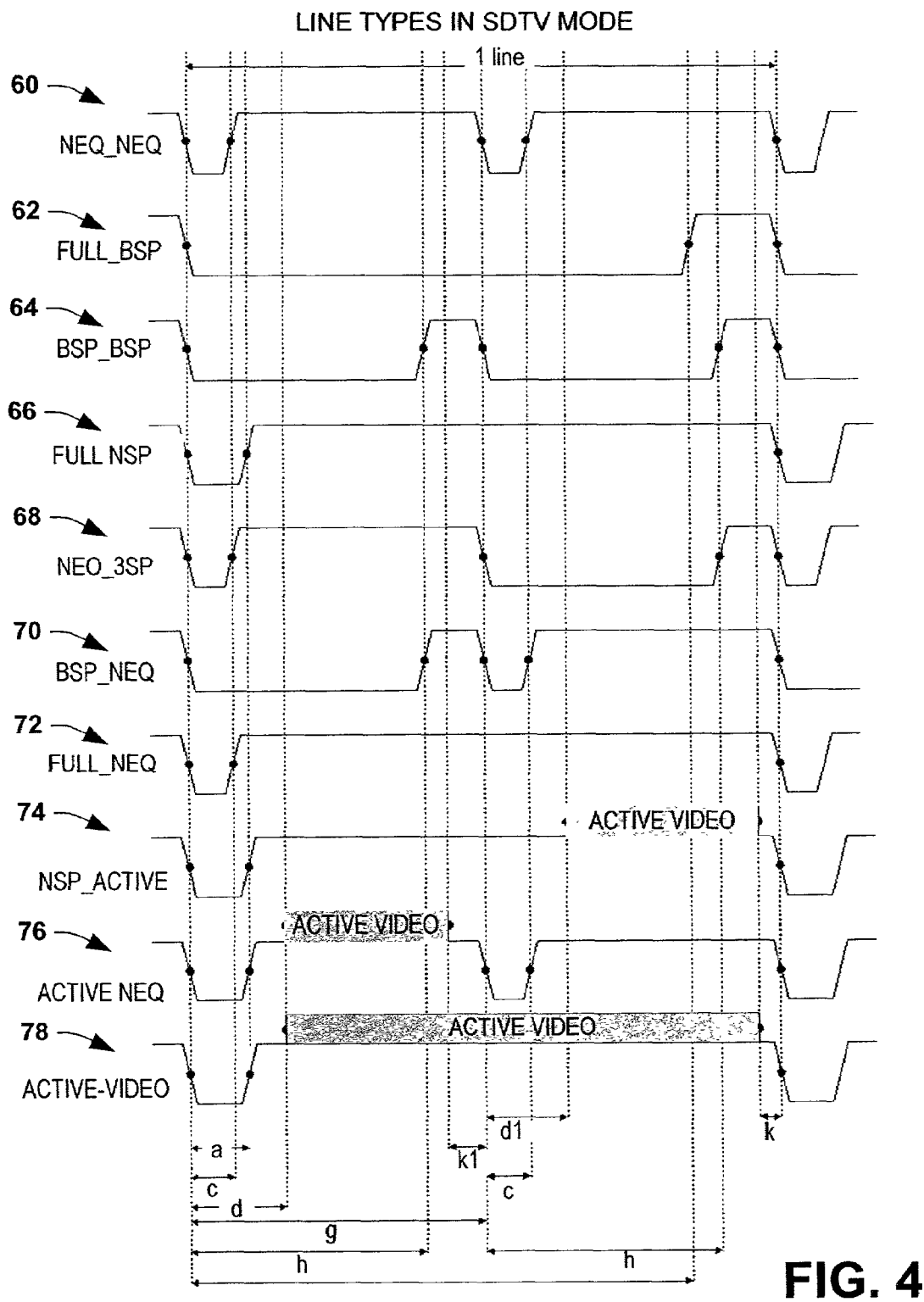
FIG. 4 illustrates a plurality of SDTV mode line types and associated programmable parameters in accordance with an aspect of the present invention.

The display timing generator of the present example provides for programmability and modification of these formats. FIG. 3 illustrates the line types available when the display timing generator is configured in "HDTV mode". These HDTV line types use "tri-level synchronization" signals. The line types for "HDTV mode" include a blank level (FULL_NTSP) line type 40, a broad pulse (FULL_BTSP) line type 42, an interlaced sync (NTSP_NTSP) line type 44, an interlaced sync and a broad pulse in 2nd half (NTSP_BTSP) line type 46, a broad pulses and interlaced sync (BSTP_BTSP) type 48 and broad pulse in 1st half w/interlaced sync (BTSP_NTSP) type 50. FIG. 4 illustrates the line types available when the display timing generator is configured in "SDTV mode". These SDTV line types use "bi-level" (negative) synchronization signals. The line types for the SDTV mode include a double equalization pulse (NEQ_NEQ) line type 60, a broad sync pulse (FULL_BSP) line type 62, a broad sync pulse with serration pulse (BSP_BSP) line type 64, a blanking level (FULL_NSP) line type 66, an equalization pulse with 2nd half-line sync pulse (NEQ_BSP) line type 68, a 1st half-line sync pulse with equalization pulse (BSP_NEQ) line type 70, an equalization pulse (FULL_NEQ) line type 72, a blanking in 1st half line plus video (NSP_ACTIVE) line type 74 and a video plus blanking in 2nd half-line (ACTIVE_NEQ) line type 76. ACTIVE_VIDEO line type 78 is employed in both HDTV mode and SDTV mode, with a negative sync pulse for SDTV as illustrated in FIG. 4, and a tri-level sync pulse for HDTV formats.

The display timing generator of the present invention includes an exhaustive parameter set that describes each video line type format. As illustrated in FIG. 3, a plurality of parameters (e.g., a, b, c, d, e, f, g, h, $0_H$) are associated with timing characteristics of each of the line types of the HDTV mode. As illustrated in FIG. 4, a plurality of parameters (e.g., a, c, d, d1, g, h, k, k1) are associated with timing characteristics of each of the line types of the SDTV mode. The display timing generator of the present invention allows for programmability and adjustment of one or more of these parameters so that a user can provide the appropriate timing signals and synchronization associated with a particular display device. Alternatively, the user can employ default timing characteristics associated with each line type stored in the display timing generator. The present example is illustrated with respect to partitioning an available set of video modes into three categories: SDTV, HDTV and PC graphics. Depending on the general nature of each video format, several line types are defined, as is shown in FIGS. 3–4 for the set of line types available in the HDTV and SDTV operating modes, respectively. However, additional line types can be provided with associated parameter sets so that other display type formats can be added.

Figure 5:
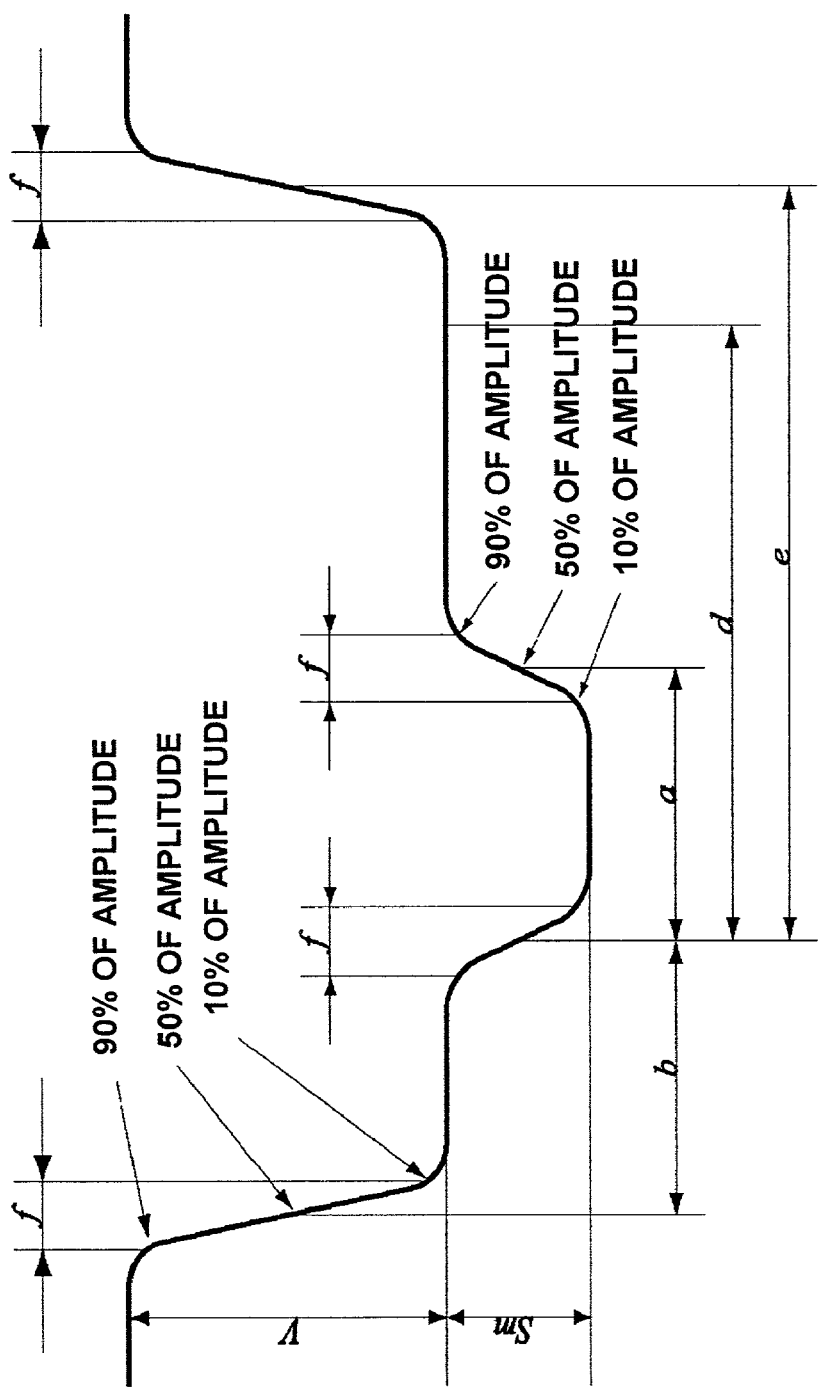
FIG. 5 illustrates a SDTV synchronization signal and associated programmable parameters in accordance with an aspect of the present invention.

With each line type a set of horizontal timing parameters is associated that also includes the timing definition of the horizontal synchronization signal waveform. FIG. 5 illustrates a SDTV horizontal synchronization signal waveform 80 having a plurality of associated parameters (e.g., a, b, d, e, f, Sm, V). The plurality of associated timing parameters not only includes pulse widths but also voltage amplitudes so that signal level can be adjusted based on the type of monitor or display being employed. This set of horizontal timings parameters are user-programmable.

Figure 6:
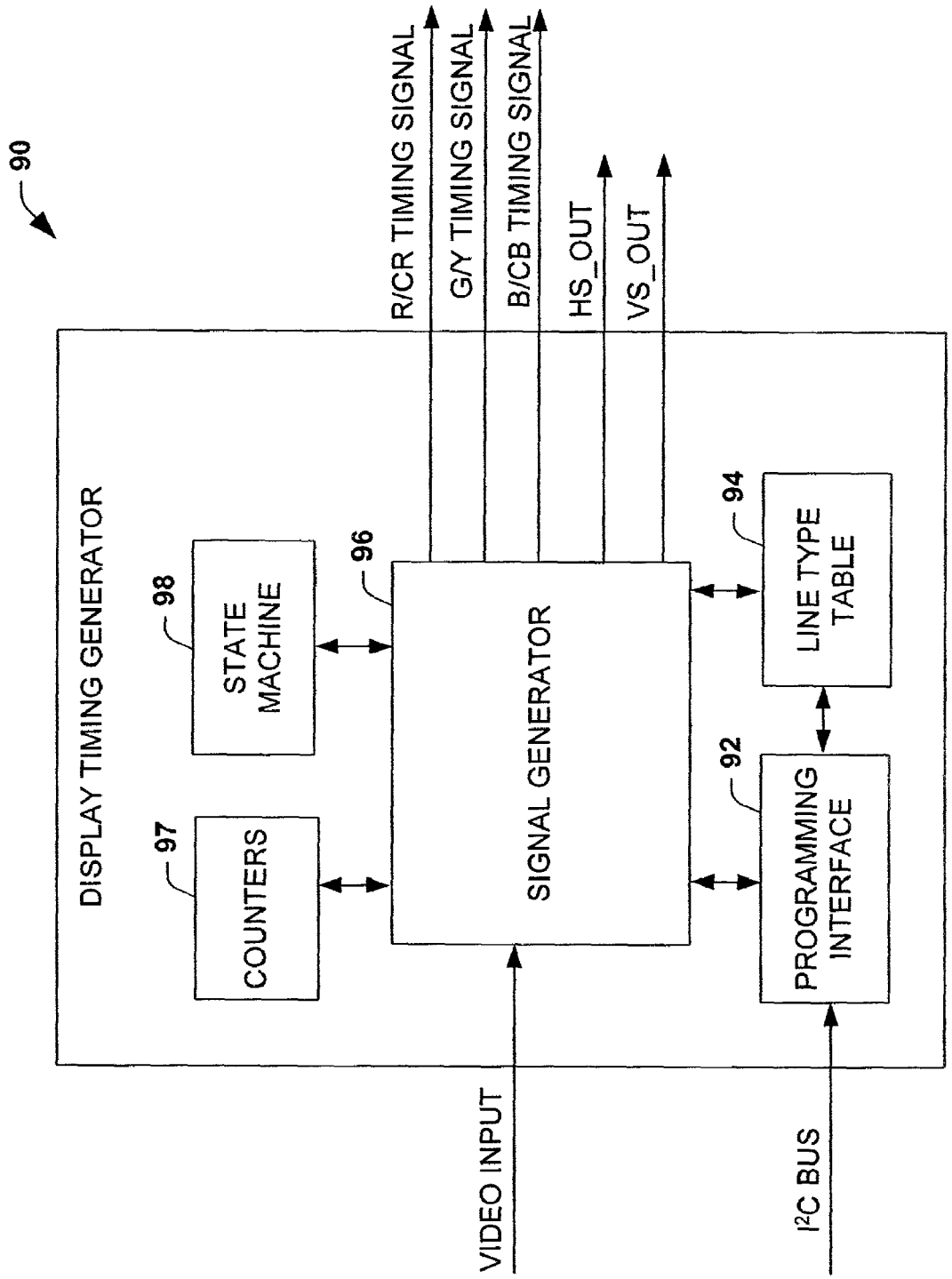
FIG. 6 illustrates a block diagram of a display timing generator in accordance with an aspect of the present invention.

FIG. 6 illustrates a block diagram of a display timing generator 90 in accordance with an aspect of the present invention. A programming interface 92 is provided to allow a user to program the display timing generator 90 using a programming device (e.g., PC) from a host processor. The present example utilizes an industry standard I²C Interface to an I²C bus for programming of the display timing generator 90. It is to be appreciated that a plurality of different interfaces can be employed to program the display timing generator 90. The display timing generator 90 can be programmed off-line or in realtime in a programming mode. The programming interface 92 allows a user to set line types for different lines in a frame, modify timing and amplitude levels for one or more parameters associated with line types and modify timing associated with synchronization signals.

The user can select from a number of "preset" video formats, each of which activates a pre-determined sequence of line type selections over the video frame, in order to create a standardized video format. Alternatively, the user can generate a custom format by utilizing a generic mode where the line type selection can be programmed arbitrarily. The user can also select whether to operate the digital timing generator in either "slave mode" where synchronization signals, either embedded in the video data or over dedicated signal lines, are to be received, or whether to generate synchronization signals in "master mode" to an external "source" device, that will subsequently respond to these synchronization signals by sending video data to the video processing system that contains the digital timing generator.

The programming interface 92 then creates a table 94 for each video frame format of a sequence of combinations (e.g., line type#, breakpoint line#) which enumerate the line number in the frame (or field, in the case of interlaced video) where the display timing generator 90 needs to switch from the currently active line type to the next line type as defined by a "line type#" index associated with a current "breakpoint line#". The next line type will be generated until the "breakpoint line#" of the next table entry is reached.

While presets for the present example are provided for this table for HDTV and SDTV formats, the user has complete programmability of the combinations (line type#, breakpoint line#), as well as horizontal timing definitions of the video format's synchronization with respect to the actual video data. By selecting a certain line type, the waveform shape is established. The maximum supported complexity of the video frame is only limited by the number of pre-programmed waveform shapes (which limits the complexity of the excursions on a single video line) as well as by the maximum length of the table (which limits the number of line type transitions within one video frame). The present invention can be extended to allow for the generation of any video format by definition of additional horizontal waveform shapes or by lengthening of the table. The user will appreciate that many variations to the programming interface for defining the frame format are possible in accordance with the present invention. A set of horizontal (pixel) and vertical (line) counters 97 are used within the digital timing generator 90 to provide count information to a signal generator 96.

A state machine 98 is coupled to the signal generator 96. The state machine 98 monitors the duration of each portion of the video line (e.g., active video, front-porch of sync, back-porch of sync, etc.). This state machine 98 also provides the limited rise/fall time on the actual excursions. In "slave mode", the signal generator 96 receives the video synchronization input including start active video (SAV) and end active video (EAV) signals. The signal generator 96 then retrieves the line types and associated parameters of the line types, and horizontal timing parameters associated with the horizontal synchronization signals. The signal generator 96 then provides timing signals associated with the component video signals (e.g., RGB, YCBCR) for each line based on the selected line types for a complete frame. Additionally, dedicated synchronization signals are provided HS_OUT and VS_OUT if the user has programmed the display timing generator to provide dedicated synchronization signals. When configured in "slave mode", the display timing generator will be in free-run according to the programmed video frame format and generate video synchronization signals to the video source according to its internal timing.

Figure 7:
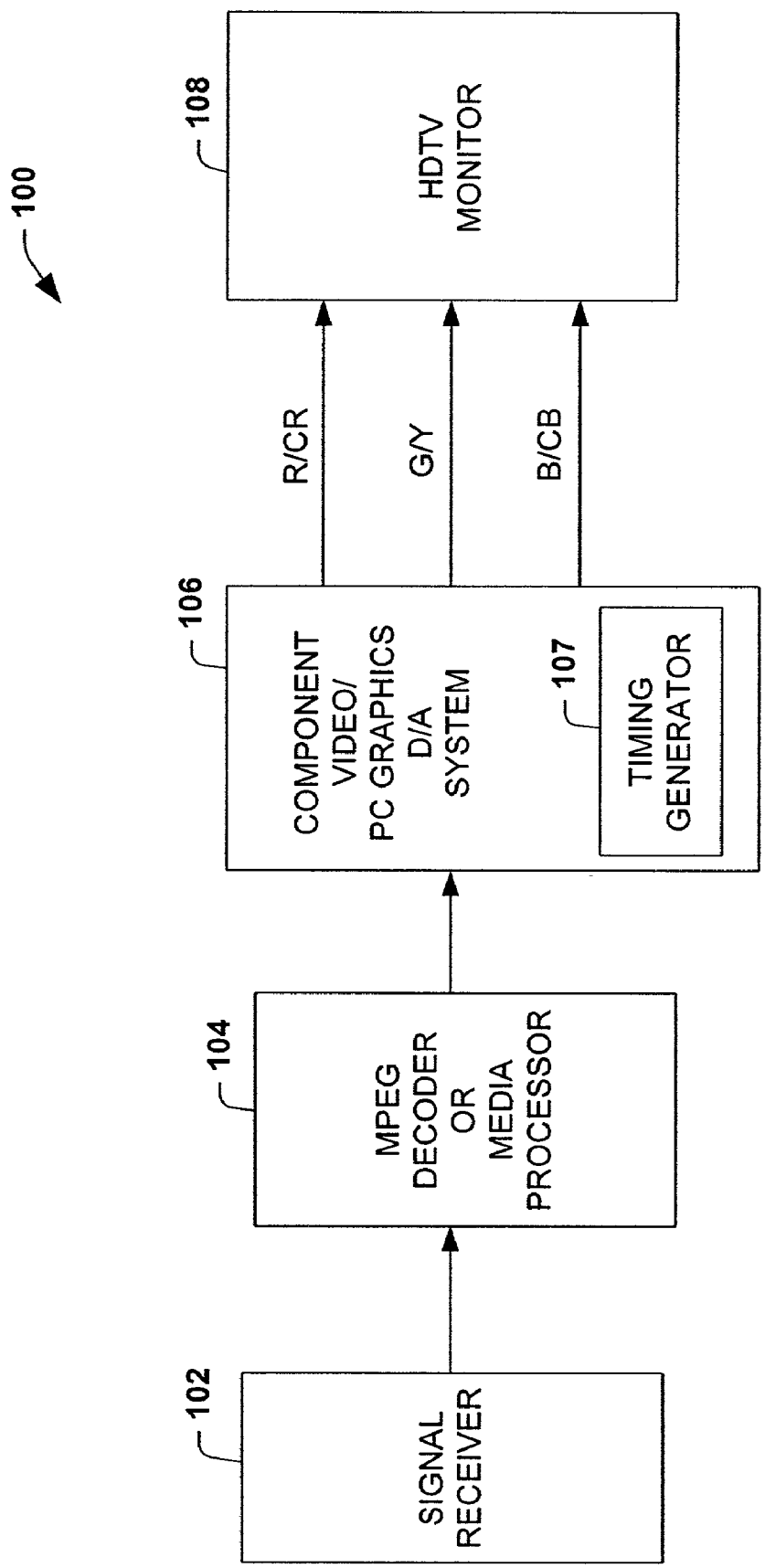
FIG. 7 illustrates a block diagram of a video system utilizing a display timing generator for providing timing signals to component video data for displaying on a HDTV monitor in accordance with an aspect of the present invention.

FIG. 7 illustrates a video system application 100 where a display timing generator 107 is programmed to provide component video signals to an HDTV monitor 108. The video system application 100 includes a signal receiver (e.g., STB, DVD) 102 operative to receive video stream data via satellite, cable, memory or the like. The signal receiver 102 filters the video stream and provides the video stream data to a MPEG decoder or media processor component 104. The MPEG decoder or media processor component 104 decompresses and/or decodes the video data. The MPEG decoder or media processor component 104 then provides the decompressed and/or decoded video data stream to the component video/PC graphics D/A system 106. The component video/PC graphics D/A system 106 may additionally include the functionality associated with multiplexing the digital video, color space conversion, video filtering, data management, data insertion and inserting the appropriate synchronization pulses or signals, next to performing digital-to-analog conversion of the digital data to provide analog component video signals (RGB, YCbCr) to the HDTV monitor 108.

The display timing generator 107 is implemented into the component video/PC graphics D/A system 106. The component video/PC graphics D/A system 106 and the display timing generator 107 can be integrated into a single integrated circuit or be comprised of a plurality of separate components. The video display timing generator 107 is programmed to provide line types, horizontal timing parameters associated with the line types and provide horizontal synchronization signals and timing parameters associated with the horizontal synchronization signals. The video display timing generator 107 is programmed to provide the appropriate timing synchronization at the desired voltage amplitude and timing widths to facilitate optimal displaying of analog component video signals (e.g., RGB, YCbCr) to the HDTV monitor 108.

Figure 8:
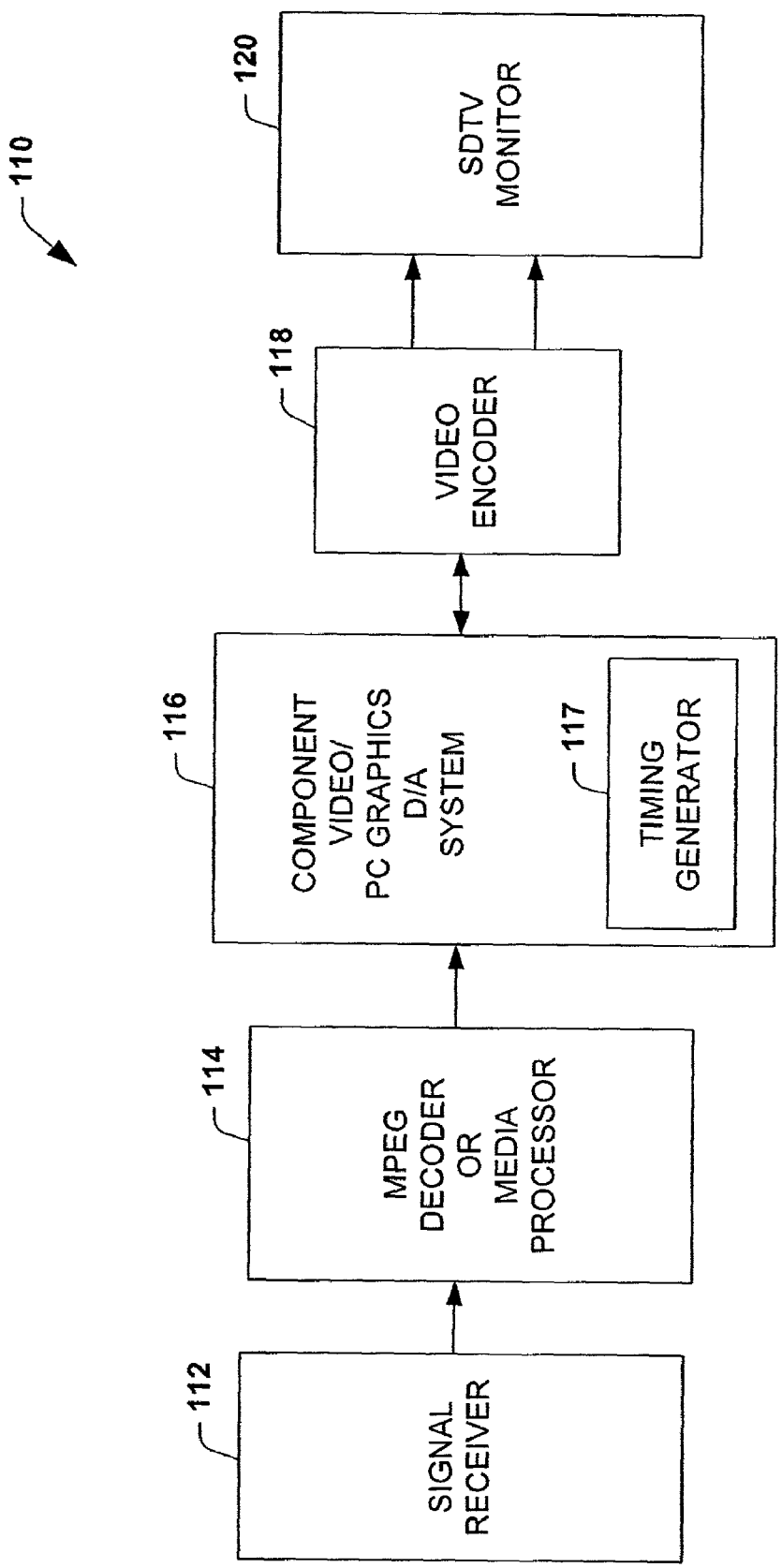
FIG. 8 illustrates a block diagram of a video system utilizing a display timing generator for providing timing signals to component video data for displaying on a SDTV monitor in accordance with an aspect of the present invention.

FIG. 8 illustrates a video system application 110 where a display timing generator 117 is programmed to provide timing associated with component video signals to a composite video encoder 118 coupled to a SDTV monitor 120. The video system application 110 includes a signal receiver 112 (e.g., STB, DVD) operative to receive video stream data. The signal receiver 112 receives and filters the video stream and provides the video stream data to a MPEG decoder or media processor component 114. The MPEG decoder or media processor component 114 decompresses and/or decodes the video data. The MPEG decoder or media processor component 114 then provides the decompressed and/or decoded video data stream to a component video/PC graphics D/A system 116. The display timing generator 117 is implemented into the component video/PC graphics D/A system 116.

The component video/PC graphics D/A system 116 may additionally include the functionality associated with multiplexing the digital video, color space conversion, video filtering, data management, data insertion and inserting the appropriate synchronization pulses or signals, next to performing digital-to-analog conversion of the digital data to provide the analog component video signals (e.g., RGB, YCbCr) to the composite video encoder 118. The component video/PC graphics D/A system 116, the display timing generator 117 and optionally the composite video encoder 118 can be integrated into a single integrated circuit or be comprised of a plurality of components.

The video display timing generator 117 is programmed to provide timing associated with line types and synchronization signals. The video display timing generator 117 is programmed to provide the appropriate timing synchronization at the desired voltage amplitude and timing widths to provide to the video encoder 118. The video encoder 118 then encodes the component video into composite/S-video format and provides the composite/S-video format to the SDTV monitor 120. The video encoder 118 can be adapted to provide the composite/S-video format in the NTSC standard and/or the PAL standard and the SDTV monitor 120 can be adapted to display the composite/S-video format in the NTSC standard and/or the PAL standard. The D/A system's output of the component video/PC graphics D/A system 116 can also be used directly prior to NTSC/PAL encoding.

Alternatively, when the composite video encoder is implemented in the digital domain and thus the interface to the video encoder is digital, the analog component output signals of the component D/A system that includes the digital timing generator can be used directly, next to the composite video encoder's output. The input to the digitally implemented composite video encoder (with included D/A for composite video or S-Video) is in this case identical to the input to the D/A system of the component video/PC graphics D/A system 116.

Figure 9:
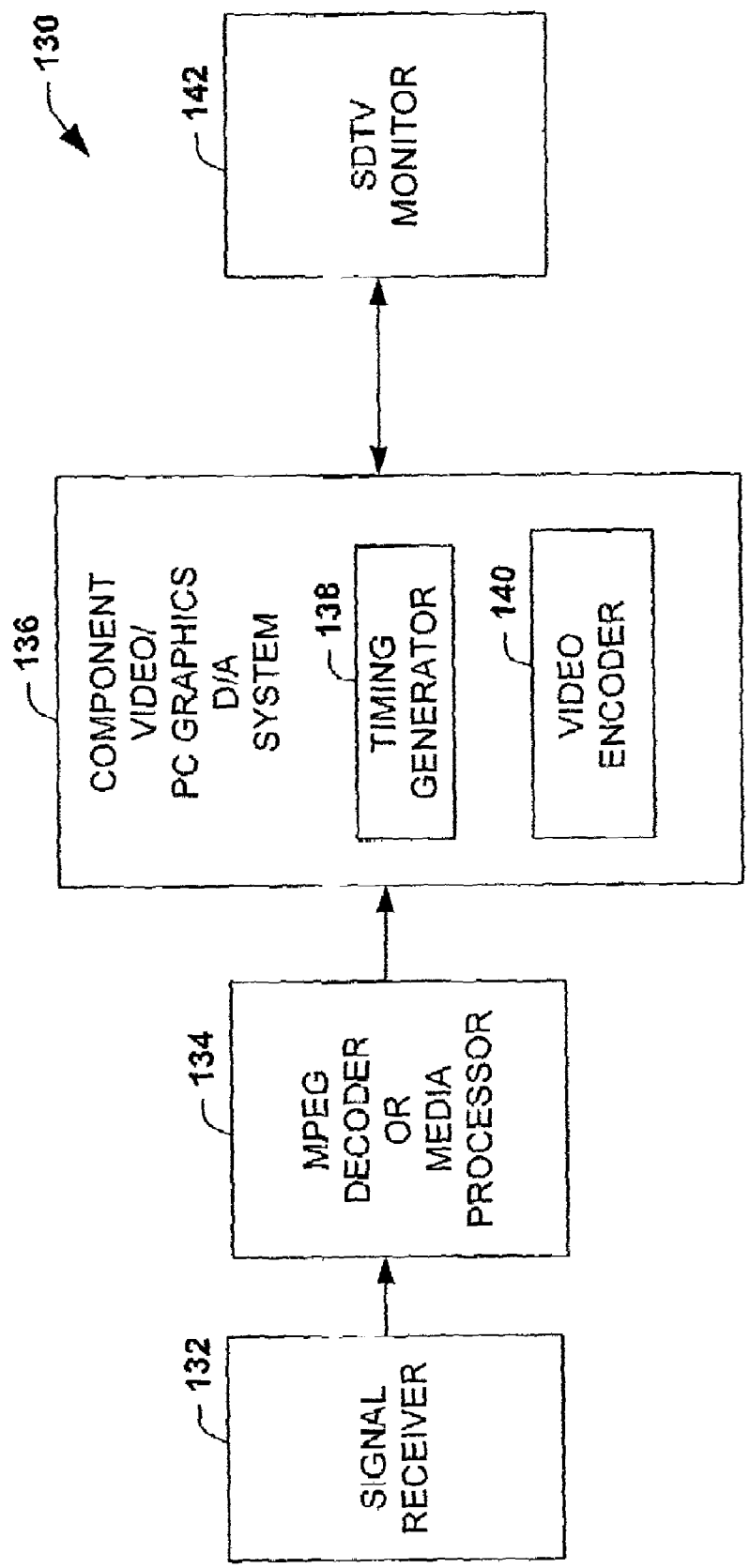
FIG. 9 illustrates a block diagram of an alternate video system utilizing a display timing generator for providing timing signals to component and composite video data, utilizing an embedded composite video encoder, for displaying on a SDTV monitor in accordance with an aspect of the present invention.

FIG. 9 illustrates an alternate video system application 130 where a display timing generator 138 is programmed to provide timing associated with component video signals and a digital composite video encoder 140 is provided to convert the component video into composite/S-video format to provide to a SDTV monitor 142. The video system application 130 includes a signal receiver 132 (e.g., STB, DVD) operative to receive video stream data. The signal receiver 132 receives and filters the video stream and provides the video stream data to a MPEG decoder or media processor component 134. The MPEG decoder or media processor component 134 decompresses and/or decodes the video data. The MPEG decoder or media processor component 134 then provides the decompressed and/or decoded video data stream to a component video/PC graphics D/A system 136. The display timing generator 138 and the composite video encoder 140 are implemented into the component video/PC graphics D/A system 136.

The component video/PC graphics D/A system 136 may additionally include the functionality associated with multiplexing the digital video, color space conversion, video filtering, data management, data insertion and inserting the appropriate synchronization pulses or signals, prior to performing digital-to-analog conversion of the digital data to provide digital component video signals to the digital composite video encoder 140. The component video/PC graphics D/A system 136, the display timing generator 138 and optionally the composite video encoder 140 can be integrated into a single integrated circuit or be comprised of a plurality of components.

The video display timing generator 138 is programmed to provide timing associated with line types and synchronization signals. The video display timing generator 138 is programmed to provide the appropriate timing synchronization at the desired voltage amplitude and timing widths to the component video signals. The video encoder 140 receives digital composite video created from the component video in the digital domain. The video encoder 140 converts the digital composite video signal into analog composite video using integrated D/A converters. The video encoder 140 also encodes the component video into composite/S-video format and provides the composite/S-video format to the SDTV monitor 142. The video encoder 140 can be adapted to provide the composite/S-video format in the NTSC standard or the PAL standard and the SDTV monitor 142 can be adapted to display the composite/S-video format in the NTSC standard or the PAL standard.

Figure 10:
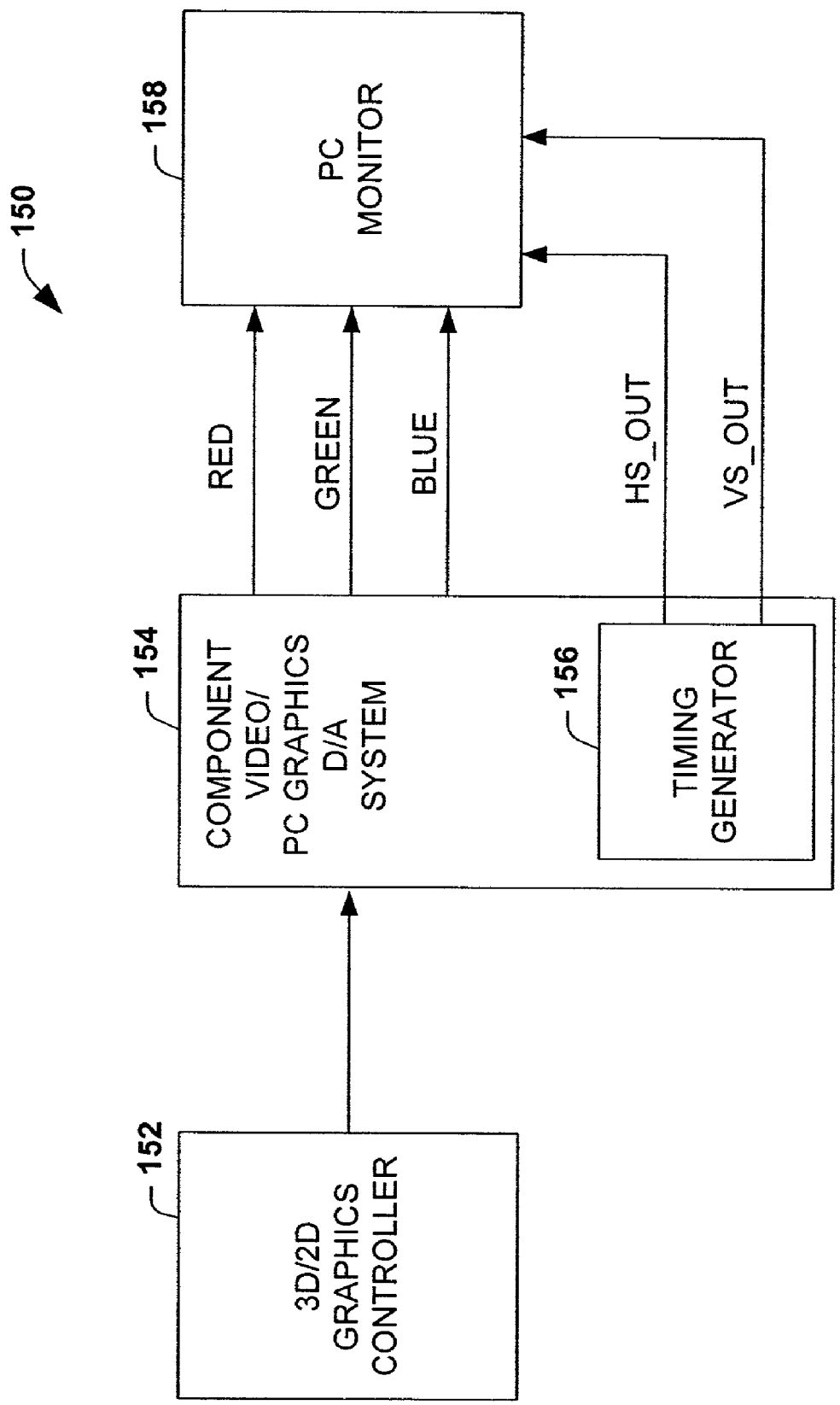
FIG. 10 illustrates a block diagram of a video system utilizing a display timing generator for providing timing signals to component video data for displaying on PC monitor in accordance with an aspect of the present invention.

FIG. 10 illustrates a computer graphics application 150 where a display timing generator 156 is programmed to provide component video signals to a PC monitor (e.g., VESA compatible CRT monitor). The video system application 150 includes a 3D/2D graphics controller device 152. The graphics controller device 152 provides video stream data (e.g., 24-bit format) to a component video/PC graphics D/A system 154. A display timing generator 156 is implemented into the component video/PC graphics D/A system 154. The component video/PC graphics D/A system 154 can be integrated into a single integrated circuit or be comprised of different components. The display timing generator 156 is programmed to provide line types and provide separate horizontal (HS_OUT) and vertical (VS_OUT) synchronization signals. The display timing generator 156 is programmed to provide the appropriate timing synchronization at the desired voltage amplitude and timing widths to facilitate optimal displaying of component video signals (e.g., red, green, blue) to the PC monitor 158.

Figure 11:
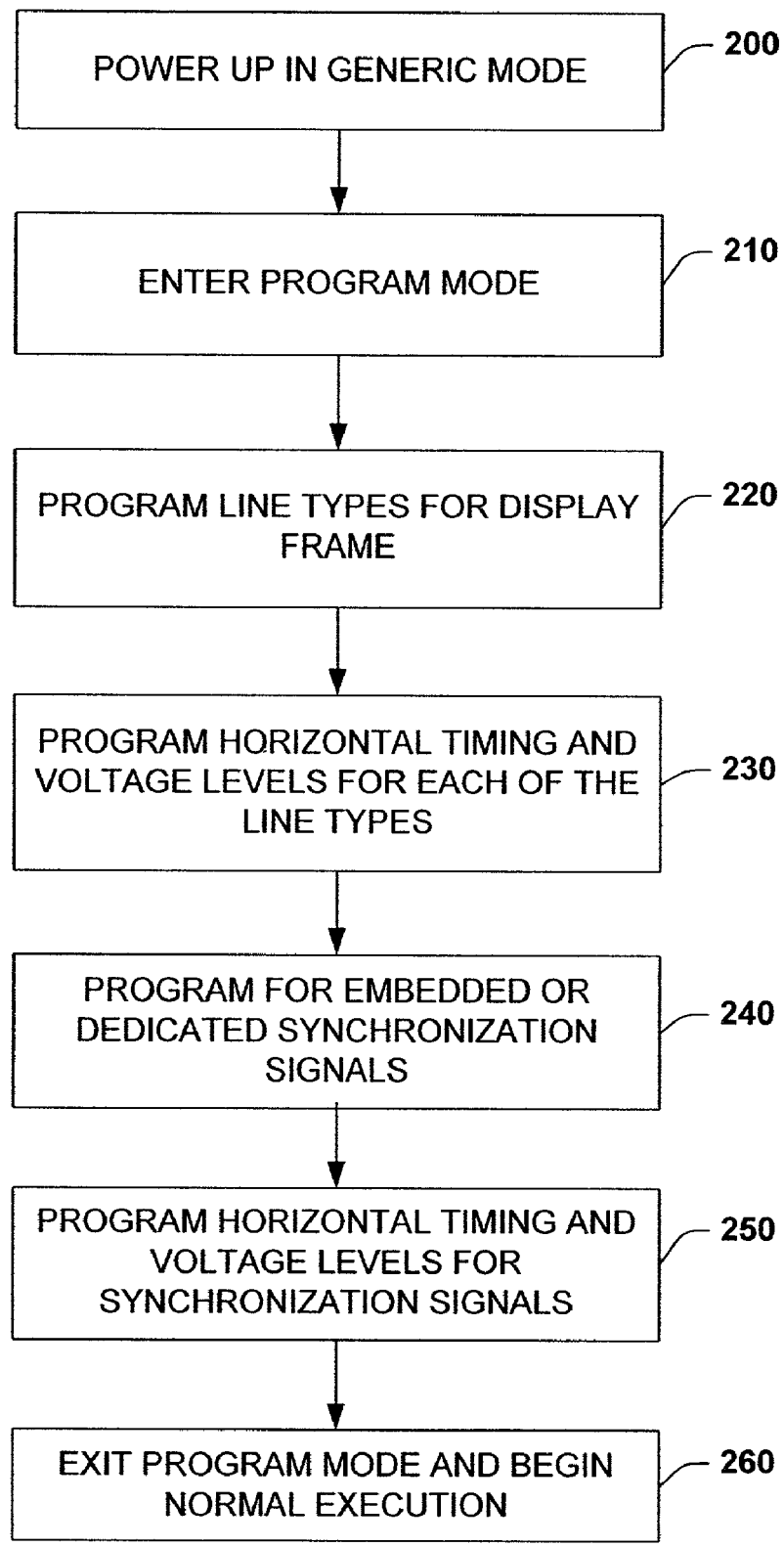
FIG. 11 illustrates a flow diagram of a methodology for programming a display timing generator in accordance with an aspect of the present invention.

In view of the foregoing structural and functional features described above, a methodology in accordance with various aspects of the present invention will be better appreciated with reference to FIG. 11. While, for purposes of simplicity of explanation, the methodology of FIG. 11 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 11 illustrates one particular methodology for programming the display timing generator in accordance with one particular aspect of the present invention. The methodology begins at 200 where the display timing generator is powered up in generic mode. For example, the user can connect to the display timing generator through a host controller interface such as an I2C interface to a PC or some type of controller. The display timing generator then enters the program mode at 210. At 220, the user programs the line types to display a single frame. For example, the frame can have 200 lines with 18 different line types to choose for each of the lines. At 230, the horizontal timing and voltage levels for each of the line types is programmed. One or more registers can be associated with a line type and one or more parameters stored in the registers defining the one or more parameters of the line type.

At 240, the display timing generator is programmed for embedded synchronization signals or dedicated synchronization signals both at the input and the output. This informs the display timing generator to look to an associated pin for the input synchronization signal or to the data pattern and also whether to generate dedicated synchronization signals or to insert the synchronization signals into the component video prior to D/A conversion. At 250, the horizontal timing and amplitude voltage levels for the synchronization signals are programmed. One or more registers can be associated with the synchronization signals and one or more parameters stored in the registers defining the one or more parameters of the synchronization signals. Alternatively, the synchronization signal parameters can be programmed with the line type parameters at 230. At 260, the display timing generator exits the program mode and is ready for normal execution. The data source can then be turned on and the display timing generator defines the line types and timing associated with the line types and the synchronization signals.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A display timing generator for generating timing associated with component video signals in a desired display format, the display timing generator comprising:
   a programming interface operative to allow a user to select different line types for different lines in a frame and one or more timing parameters associated with a corresponding line type; and
   a signal generator operative to receive digital video data and provide the selected line types and timing associated with the selected one or more different timing parameters for the different lines in a frame, the selected line types and timing associated with the selected one or more timing parameters being insertable into digital component video signals to provide a desired display format.

2. The display timing generator of claim 1, the one or more timing parameters being user programmable and comprising pulse widths and amplitude levels of horizontal synchronization signals.

3. The display timing generator of claim 1, the one or more timing parameters being associated with excursions of the line types.

4. The display timing generator of claim 1, the programming interface operative to create a line type table which the signal generator utilizes to provide the desired display format.

5. The display timing generator of claim 1, the programming interface operative to allow a user to select from a set of pre-stored line types and associated timing parameters.

6. The display timing generator of claim 5, the set of pre-stored line types comprising high definition television line types and standard definition television line types.

7. The display timing generator of claim 1, the programming interface operative to allow a user to create custom line types and timing associated with the custom line types in a generic mode.

8. The display timing generator of claim 1, further comprising a state machine that monitors the time duration of video lines and the rise and fall time of the video lines.

9. The display timing generator of claim 1, the display timing generator being operative to receive and provide dedicated horizontal and vertical synchronization signals.

10. The display timing generator of claim 1, being integrated into a component video and personal computer graphics digital-to-analog converter system.

11. The display timing generator of claim 10, the component video and personal computer graphics digital-to-analog converter system being an integrated circuit.

12. The display timing generator of claim 1, the line types comprising at least one of tri-level synchronization signals and bi-level synchronization signals.

13. The display timing generator of claim 1, the line types defining rise and fall times, synchronization shapes and horizontal and vertical timings for providing a desired display format.

14. The display timing generator of claim 1, the display timing generator having a master timing mode that imposes a user defined video display timing format onto a video source and a slave timing mode that slaves synchronization to a source video format.

15. The display timing generator of claim 14, the display timing generator being programmable to select between the master timing mode and the slave timing mode.

16. The display timing generator of claim 1, the display timing generator being programmable to select between providing dedicated synchronization signals and embedded synchronization signals.

17. A method for providing timing associated with digital component video, the method comprising:

storing a set of line types and timing parameters associated with the line types;

providing a display timing generator with a programming interface, the programming interface being adapted to allow a user to select between the set of line types and associated timing parameters; and creating a line type table that provides the display timing generator with the selected line types and associated timing parameters when receiving component video data, so that the display timing generator can provide the selected line types and associated timing parameters to the component video data.

18. The method of claim 17, the line types comprising high definition television line types and standard definition television line types.

19. The method of claim 17, further comprising providing the programming interface with a generic mode that allows a user to create custom line types and associated timing parameters.

* * * * *